US009545833B2

(12) United States Patent
Kim

(10) Patent No.: US 9,545,833 B2
(45) Date of Patent: Jan. 17, 2017

(54) METHOD FOR CONTROLLING AIR CONDITIONING UNIT OF VEHICLE

(71) Applicant: Kia Motors Corp., Seoul (KR)

(72) Inventor: Yong Chul Kim, Hwaseong-si (KR)

(73) Assignee: Kia Motors Corp., Seoul (KR)

( * ) Notice: Subject to any disclaimer, the term of this patent is extended or adjusted under 35 U.S.C. 154(b) by 322 days.

(21) Appl. No.: 14/285,148

(22) Filed: May 22, 2014

(65) Prior Publication Data

US 2015/0168049 A1 Jun. 18, 2015

(30) Foreign Application Priority Data

Dec. 18, 2013 (KR) .................. 10-2013-0158095

(51) Int. Cl.
  *B60H 1/00* (2006.01)
(52) U.S. Cl.
  CPC ...... *B60H 1/00828* (2013.01); *B60H 1/00285* (2013.01); *B60H 2001/003* (2013.01)
(58) Field of Classification Search
  CPC ............. F25B 2700/00; F25B 2700/17; F25B 2600/11; F25B 2600/112; B60H 1/00842; B60H 1/00828; F25D 17/08
  USPC .................................... 62/186, 187
  See application file for complete search history.

(56) References Cited

U.S. PATENT DOCUMENTS

| | | | | |
|---|---|---|---|---|
| 4,537,035 A | * | 8/1985 | Stiles | F24F 1/022 165/250 |
| 4,928,499 A | * | 5/1990 | Kiminami | B60H 1/00735 165/43 |
| 5,937,664 A | * | 8/1999 | Matsuno | B60H 1/00278 62/186 |
| 6,367,271 B2 | * | 4/2002 | Forrest | B60H 1/00735 62/186 |
| 9,090,145 B2 | * | 7/2015 | Baker | B60H 1/00821 |
| 9,266,406 B2 | * | 2/2016 | Morikawa | B60H 1/00828 |
| 9,327,578 B2 | * | 5/2016 | Itoh | B60H 1/00064 |

FOREIGN PATENT DOCUMENTS

| | | |
|---|---|---|
| JP | 2002-219923 A | 8/2002 |
| JP | 3573682 B2 | 10/2004 |
| JP | 2013121740 A | 6/2013 |
| KR | 10-2007-0034792 A | 3/2007 |
| KR | 1020130057652 A | 6/2013 |
| KR | 1020130091400 A | 8/2013 |

* cited by examiner

*Primary Examiner* — Timothy L Maust
(74) *Attorney, Agent, or Firm* — Morgan, Lewis & Bockius LLP

(57) ABSTRACT

A method of controlling an air conditioning system can select several airflow modes with one air conditioner. The method includes a mode check step that checks whether the number of airflows of the air conditioner decreases, a state check step that checks whether a blower is selected to a minimum air amount mode, and a minimum operation step that operates a blower motor with a minimum torque smaller than a minimum start torque, if the number of airflows of the air conditioner decreases and the blower is selected to the minimum air amount mode.

6 Claims, 2 Drawing Sheets

METHOD FOR CONTROLLING AIR CONDITIONING UNIT OF VEHICLE

CROSS REFERENCE TO RELATED APPLICATION

The present application claims priority of Korean Patent Application Number 10-2013-0158095 filed on Dec. 18, 2013, the entire contents of which application are incorporated herein for all purposes by this reference.

BACKGROUND OF INVENTION

Field of Invention

The present invention relates to a method of controlling an air conditioning system for reducing noise and excessive increase in an amount of wind when changing into a driver's seat mode of the air conditioning system.

Description of Related Art

In electric vehicles of the related art, there is a defect in individual air conditioning (driver's seat air conditioning mode) that sends out air to the driver's seat. When air is discharged only to the driver's seat, thermal comfort decreases due to an increase in the amount of air sent to the driver's seat, and even if a minimum current is supplied to a blower motor and the blower motor is driven at a minimum level, the air that has been discharged to all of the driver's seat and the passenger seats is discharged only to the driver's seat, so air of about two times is discharged to the driver's seat and it causes thermal discomfort.

Further, noise also increases, so that a problem of noise due to rapid increase in amount of air is generated when entering the driver's seat mode. The noise can be reduced by decreasing the current supplied to the blower at a high level of air, but it is impossible to solve the problem due to noise when entering individual air conditioning in the operation with minimum amount of air.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a method of controlling an air conditioning system for reducing noise and excessive increase in the amount of wind when changing into a driver's seat mode of the air conditioning system.

An aspect of the present invention provides a method of controlling an air conditioning system that can select several airflow modes with one air conditioner. The method includes a mode check step that checks whether number of airflows of the air conditioner decreases, a state check step that checks whether a blower is selected to a minimum air amount mode, and a minimum operation step that operates a blower motor with a minimum torque smaller than a minimum start torque, if the number of airflows of the air conditioner decreases and the blower is selected to the minimum air amount mode.

After the mode check step, the method may further include: an operation check step that checks whether the blower is already operating, and a starting step that operates the blower with the minimum start torque for a predetermined time if the blower needs to start operating. After the state check step, the method may further include a reduction operation step that operates the blower motor with a reduced torque lower than a current torque by a predetermined ratio, if the number of airflows of the air conditioner decreases and the blower is not selected into the minimum air amount mode.

Another aspect of the present invention provides a method of controlling an air conditioning system that can be selected into a driver's seat discharge mode or an entire discharge mode with one air conditioner. The method includes a mode check step that checks whether the air conditioner is selected into the driver's seat discharge mode, a state check step that checks whether the blower is selected into a minimum air amount mode, and a minimum operation step that operates a blower motor with a minimum torque smaller than a minimum start torque, if the air conditioner is selected into the driver's seat discharge mode and the blower is selected into the minimum air amount mode.

After the mode check step, the method may further include: an operation check step that checks whether the blower is already operating, and a starting step that operates the blower with the minimum start torque for a predetermined time if the blower needs to start operating. After the state check step, the method may further include a reduction operation step that operates the blower motor with a reduced torque lower than a current torque by a predetermined ratio, if the air conditioner is selected into the driver's seat mode and the blower is not selected into the minimum air amount mode.

According to the method of controlling an air conditioning system having the structure described above, it is possible to reduce noise and an excessive increase in air amount, when changing into a driver's seat mode of an air conditioning system.

In particular, when the driver's seat mode is selected even with the minimum air amount mode selected, it is possible to reduce noise and excessive concentration of air amount and minimize fuel efficiency by controlling the blower with the minimum torque.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
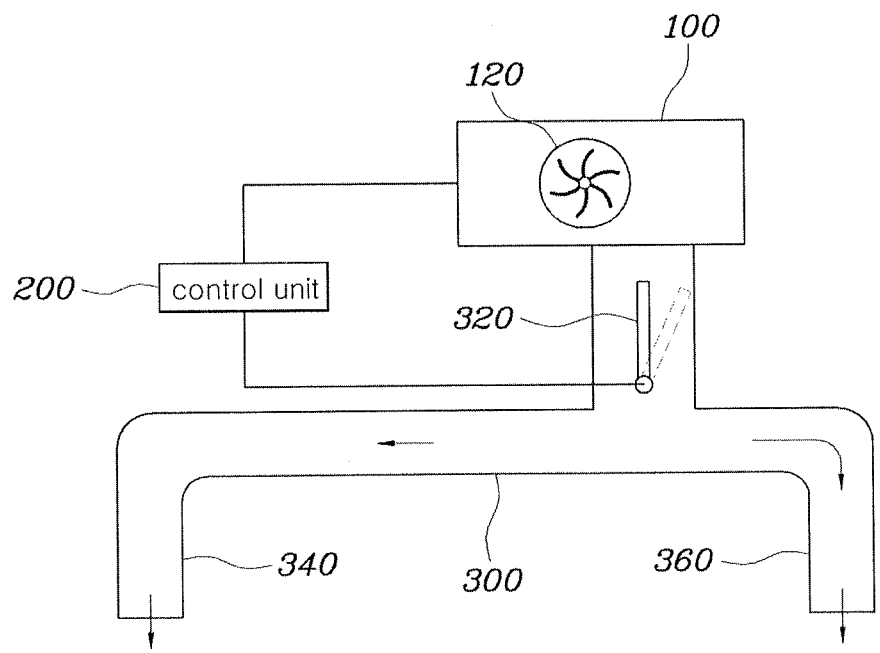
FIG. 1 is a diagram showing an air conditioning system for performing an exemplary method of controlling the air conditioning system according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
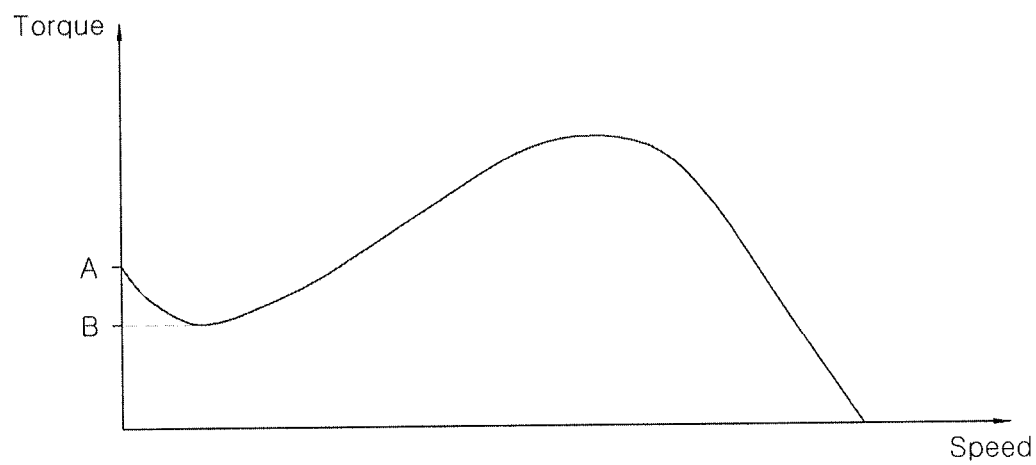
FIG. 2 is a diagram showing a performance curve of a motor in an air conditioning system.
Figure 3:
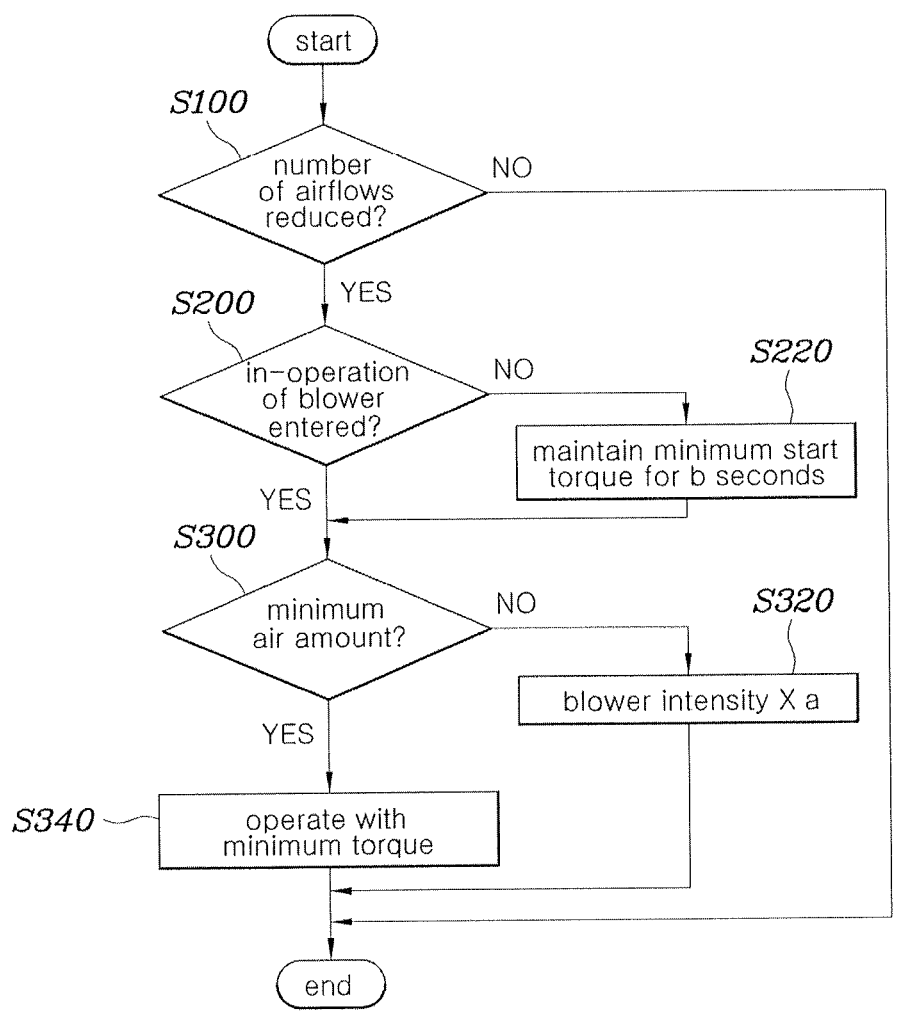
FIG. 3 is a flowchart illustrating an exemplary method of controlling an air conditioning system according to the present invention.

FIG. 1 is a diagram showing an air conditioning system for performing a method of controlling an air conditioning system according to various embodiments of the present invention, FIG. 2 is a graph showing a performance curve of a motor in an air conditioning system, and FIG. 3 is a flowchart illustrating a method of controlling an air conditioning system according to various embodiments of the present invention.

A method of controlling an air conditioning system that can be selected into several airflow modes with one air conditioner, includes: a mode check step that checks whether the number of airflows, or the number of airflow pathways, of an air conditioner decreases; a state check step that checks whether a blower has been selected into or selected to be in a minimum air amount mode; and a minimum operation step that operates a blower motor with a minimum torque smaller than a minimum start torque, when the number of airflows of the air conditioner decreases and the blower has been selected into the minimum air amount mode.

The present invention is applied to an apparatus that can selectively control several airflows in accordance with selected modes in basic air conditioning systems, and the basic concept is shown in FIG. 1. FIG. 1 is a diagram showing an air conditioning system for performing a method of controlling an air conditioning system according to various embodiments of the present invention, in which a plurality of ducts 340 and 360 diverges from a main duct 300 through one air conditioner 100 and a door 320 is provided to selectively control the airflow. The air conditioner 100 is also equipped with one blower 120. Typically, as shown in the figure, a driver's seat duct 340 and a passenger seat duct 360 diverge from the air conditioner. A control unit 200 controls the motor of the blower 120 and the door 320 in the air conditioner.

The air conditioning system can be selected into a driver's seat mode by controlling the door for air conditioning efficiency and performance, when only a driver is in a vehicle, particularly in the field in which fuel efficiency is important such as electric vehicles.

In electric vehicles of the related art, there is a defect in individual air conditioning (driver's seat air conditioning mode) that sends out air to the driver's seat. When air is discharged only to the driver's seat, thermal comfort decreases due to an increase in the amount of air sent to the driver's seat, and even if a minimum driving current is supplied to a blower motor and the blower motor is driven at a minimum level, the air that has been discharged to all of the driver's seat and the passenger seats is discharged only to the driver's seat, so about two times of air is discharged to the driver's seat and it causes thermal discomfort.

Further, noise also increases, so that a problem of noise due to rapid increase in amount of air is generated when entering the driver's seat mode. The noise can be reduced by decreasing the current supplied to the blower at a high level of air, but it is impossible to solve the problem due to noise when entering individual air conditioning in the operation with minimum amount of air.

The present invention provides a method of controlling an air conditioning system of a vehicle for reducing noise and an excessive increase in the amount of wind when changing into a driver's seat mode of the air conditioning system.

FIG. 2 is a diagram showing a performance curve of a motor of an air conditioning system, in which a common motor used in a blower needs the minimum start torque for starting in a stop state, as indicated by A in the graph. Further, as the number of revolutions of the motor gradually increases, the necessary torque decreases a little, so the blower is started with the minimum torque and the torque smoothly increases in accordance with the RPM. This is an unavoidable feature due to static friction of the motor itself, and in the related art, a blower was operated consistently with the minimum start torque A at the minimum amount of air of an air conditioning system.

Accordingly, in the present invention, when the number of airflows, or the number of airflow pathways, decreases only for the driver's seat in the minimum air amount mode, the blower motor is operated at the minimum torque B in some cases.

FIG. 3 is a flowchart illustrating a method of controlling an air conditioning system according to various embodiments of the present invention and the method of controlling an air conditioning system performs first a mode check step S100 that checks whether the number of airflows of an air conditioner decreases. When the number of airflows decreases, the method performs a state check step S300 that checks whether the blower has been selected into the minimum air-flow mode. If the number of airflows was not decreased, the air conditioning system is operated by a common control logic.

If the number of the airflows of the air conditioner decreases and the blower has been selected into the minimum air amount mode, the method performs a minimum operation step S340 that operates the blower motor with minimum torque smaller than the minimum start torque. That is, although the airflows cannot be decreased anymore because the blower is in the minimum operation mode, when the number of airflows decreases for the driver's seat mode, the blower is operated with minimum torque smaller than the minimum start torque to further decrease the airflows.

Meanwhile, after the mode check step S100, the method performs an operation check step S200 that checks whether the blower is already operating, and when the blower needs to start operating, the method performs a starting step S220 that operates the blower with the minimum start torque for a predetermined time. That is, when the blower is in stop, the blower is controlled to start with the minimum start torque for a predetermined time (b) for minimum operation, and then it is operated with the minimum torque.

Further, after the state check step S300, when the number of airflows of the air conditioner was decreased, but the blower was not selected into the minimum air amount mode, the method performs a reduction operation step S320 that operates the blower motor with reduced torque lower by a predetermined ratio than the current torque. That is, when the blower is not in the minimum air amount mode, but in the 2-stage and 3-state or more, the air amount is reduced by multiplying the air amount by an appropriate coefficient (a), for example, reducing the air amount by a half to fit the stage.

In various embodiments of the present invention, the control method of the present invention, which is a method of controlling an air conditioning system that can be selected into a driver's seat discharge mode or a entire discharge mode, includes: a mode check step S100 that checks whether the air conditioner is selected into the driver's seat discharge mode; a state check step S300 that checks whether the blower was selected into the minimum air amount mode; and a minimum operation step S340 that operates the blower motor with the minimum torque smaller than the minimum start torque, when the air conditioner is selected in the driver's seat discharge mode and the blower is selected in the minimum air amount mode.

Further, after the mode check step S100, the method may further include: the operation check step S200 that checks whether the blower is already operating; and the starting step S220 that operates the blower with the minimum start torque for a predetermined time, when the blower needs to start operating.

Further, after the state check step S300, the method may further include the reduction operation method S320 that operates the blower motor with reduced torque lower by a predetermined ratio than the current torque, when the air conditioner was selected into the driver's seat mode, but the blower was not selected into the minimum air amount mode.

According to the method of controlling an air conditioning system having the structure described above, it is possible to reduce noise and an excessive increase in air amount, when changing into a driver's seat mode of an air conditioning system. In particular, when the driver's seat mode is selected even with the minimum air amount mode selected, it is possible to reduce noise and excessive concentration of air amount and minimize fuel efficiency by controlling the blower with the minimum torque.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling an air conditioning system that can be selected into a plurality of airflow modes with one air conditioner, the method comprising:
   a mode check step that checks whether number of airflows of the air conditioner decreases;
   a state check step that checks whether a blower is selected to a minimum air amount mode; and
   a minimum operation step that operates a blower motor with a minimum torque smaller than a minimum start torque, if the number of airflows of the air conditioner decreases and the blower is selected to the minimum air amount mode.

2. The method of claim 1, further comprising:
   an operation check step, subsequent to the mode check step, that checks whether the blower is already operating; and
   a starting step that operates the blower with the minimum start torque for a predetermined time, if the blower needs to start operating.

3. The method of claim 1, further comprising:
   a reduction operation step, subsequent to the state check step, that operates the blower motor with a reduced torque lower than a current torque by a predetermined ratio, if the number of airflows of the air conditioner decreases and the blower is not selected into the minimum air amount mode.

4. A method of controlling an air conditioning system that can be selected into a driver's seat discharge mode or an entire discharge mode with one air conditioner, the method comprising:
   a mode check step that checks whether the air conditioner is selected into the driver's seat discharge mode;
   a state check step that checks whether the blower is selected into a minimum air amount mode; and
   a minimum operation step that operates a blower motor with a minimum torque smaller than a minimum start torque, if the air conditioner is selected into the driver's seat discharge mode and the blower is selected into the minimum air amount mode.

5. The method of claim 4, further comprising:
   an operation check step, subsequent to the mode check step, that checks whether the blower is already operating; and
   a starting step that operates the blower with the minimum start torque for a predetermined time, if the blower needs to start operating.

6. The method of claim 4, further comprising:
   a reduction operation step, subsequent to the state check step, that operates the blower motor with a reduced torque lower than a current torque by a predetermined ratio, if the air conditioner is selected into the driver's seat mode and the blower is not selected into the minimum air amount mode.

* * * * *